United States Patent
Niiya (10) Patent No.: US 6,831,725 B2
(45) Date of Patent: Dec. 14, 2004

(54) DISPLAY ELEMENT HAVING A SEAL MEMBER WITH UV CURABLE AND THERMOSETTING RESIN LAYERS AND PRODUCTION METHOD THEREOF

(75) Inventor: Hirotaka Niiya, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 50 days.

(21) Appl. No.: 10/345,610

(22) Filed: Jan. 16, 2003

(65) Prior Publication Data

US 2003/0137630 A1 Jul. 24, 2003

(30) Foreign Application Priority Data

Jan. 24, 2002 (JP) ........................................ 2002-015867

(51) Int. Cl.$^7$ ............................................ G02F 1/1339
(52) U.S. Cl. ........................ 349/153; 349/158; 349/190
(58) Field of Search ................................ 349/153, 154, 349/158, 190

(56) References Cited

U.S. PATENT DOCUMENTS

| | | | | |
|---|---|---|---|---|
| 5,793,461 A | * | 8/1998 | Inou | 349/153 |
| 5,877,883 A | * | 3/1999 | Inoue et al. | 359/196 |
| 5,995,172 A | * | 11/1999 | Ikeda et al. | 349/12 |
| 6,357,763 B2 | * | 3/2002 | Mathew et al. | 277/628 |
| 6,369,865 B2 | * | 4/2002 | Hinata | 349/12 |
| 6,573,972 B2 | * | 6/2003 | Sasaki | 349/190 |

FOREIGN PATENT DOCUMENTS

| | | | | |
|---|---|---|---|---|
| JP | 03-273215 | 12/1991 | | G02F/1/1339 |
| JP | 2000-241821 | 9/2000 | | G02F/1/1339 |

OTHER PUBLICATIONS

Abstracts of JP 3-273215, Ota, Dec. 4, 1991. (Standard abstract and Derwent abstract).*

* cited by examiner

Primary Examiner—Tarifur R. Chowdhury
Assistant Examiner—Andrew Schechter
(74) Attorney, Agent, or Firm—Edwards & Angell, LLP; David G. Conlin; Richard J. Roos (57) ABSTRACT

A display element comprising a pair of substrates; a display layer provided between the substrates for performing a display operation; and a looped seal member provided between the substrates for enclosing the display layer between the substrates; the substrates having different linear expansion coefficients; the looped seal member comprising a plurality of resin layers stacked from an inner side to an outer side, at least one of the resin layers being composed of a thermosetting resin, the rest of the resin layers being composed of a UV curable resin.

14 Claims, 4 Drawing Sheets

DISPLAY ELEMENT HAVING A SEAL MEMBER WITH UV CURABLE AND THERMOSETTING RESIN LAYERS AND PRODUCTION METHOD THEREOF

CROSS-REFERENCE TO RELATED APPLICATIONS

This application is related to Japanese application No. 2002-015867 filed on Jan. 24, 2002, whose priority is claimed under 35 USC § 119, the disclosure of which is incorporated by reference in its entirety.

BACKGROUND OF THE INVENTION

1. Field of the Invention

The present invention relates to a display element and a production method therefor. More specifically, the invention relates to the structure of a seal member which can accurately combine a pair of substrates between which a liquid crystal layer or an organic EL layer is held, and to a method for combining the pair of substrates with the use of the seal member.

2. Description of the Related Art

Flat panel display devices employing liquid crystal display elements are generally used as display devices for mobile phones and PDAs (personal digital assistants).

Such a flat panel display device includes a pair of glass substrates combined in a predetermined spaced opposed relationship with the intervention of a looped seal member and a liquid crystal filled in a space defined by the looped seal member between the substrates. The seal member is typically composed of a thermosetting resin such as an epoxy resin.

In recent years, there has been an increasing demand for thickness reduction, weight reduction and strength enhancement of the mobile phones and the PDAs.

To this end, an attempt has been made to employ thin, light and strong plastic substrates instead of the glass substrates for the flat panel display device. The plastic substrates have practically been applied to liquid crystal display elements of TN (twisted nematic) type and STN (super twisted nematic) type.

In recent years, the flat panel display device has been required to have a higher speed responsiveness and a higher contrast.

To satisfy this requirement, switching elements such as TFTs (thin film transistors) or MIM (metal insulator metal) elements are provided on the substrate to drive the flat panel display device by an active matrix driving method.

In general, a high temperature process at not lower than 300° C. is required for the provision of the switching elements (e.g., TFTs) on the substrate. Therefore, it is difficult to provide the TFTs on a plastic substrate having a low heat resistance. Where the switching elements (e.g., TFTs) are provided on the plastic substrate, a highly heat resistant plastic substrate should be employed.

To this end, one of the substrates on which the switching elements are provided is composed of a highly heat resistant plastic material, and the other substrate (a counter substrate or a color filter substrate) on which the switching elements are not provided is composed of an ordinary plastic material. Alternatively, one of the substrates on which the switching elements are provided is composed of glass, and the other substrate on which the switching elements are not provided is composed of a plastic material.

The higher speed responsiveness, the higher contrast, the thickness reduction, the weight reduction and the strength enhancement can be achieved by employing the aforesaid types of substrates in combination as the pair of substrates for the flat panel display device.

However, where the combination of the highly heat resistant plastic substrate and the ordinary plastic substrate or the combination of the glass substrate and the plastic substrate is employed as the pair of substrates, the substrates have significantly different linear expansion coefficients.

Since the display elements are highly microminiaturized and arranged at a higher density in the recent flat panel display device, an electrode pattern provided on the one substrate and a color filter pattern provided on the other substrate should accurately be opposed in a predetermined positional relationship when the substrates are combined. Accordingly, very precise positioning of the pair of substrates is required when the substrates are combined.

Where the highly heat resistant plastic substrate and the ordinary plastic substrate are combined with the intervention of the thermosetting resin seal member and heated for curing the seal member, the ordinary plastic substrate expands to a greater extent than the highly heat resistant plastic substrate.

Where the glass substrate and the plastic substrate are combined with the intervention of the thermosetting resin seal member and heated for curing the seal member, the plastic substrate expands to a greater extent than the glass substrate.

If the other substrate expands to a greater extent than the one substrate and is fixed in an offset relationship with respect to the one substrate, the electrode pattern on the one substrate and the color filter pattern on the other substrate are not opposed in the predetermined positional relationship.

One known approach to this problem is to employ a seal member composed of a UV curable resin. Another known approach is to temporarily fix the substrates with their margins bonded by a seal member of a UV curable resin and finally bond the substrates with a seal member of a thermosetting resin (see, for example, Japanese Unexamined Patent Publication No. 2000-241821).

Where the pair of substrates are combined with the use of the UV curable resin seal member alone, there is a possibility that the substrates are offset from each other before the seal member is cured. This is because the UV curable resin seal member has a lower viscosity and a poorer adhesiveness to the substrates than the thermosetting resin seal member.

Where the pair of substrates are temporarily fixed with the use of the UV curable resin seal member and finally bonded with the thermosetting resin seal member, the less heat resistant substrate may be deformed to be bulged by heat applied for curing the thermosetting resin seal member.

Figure 10:
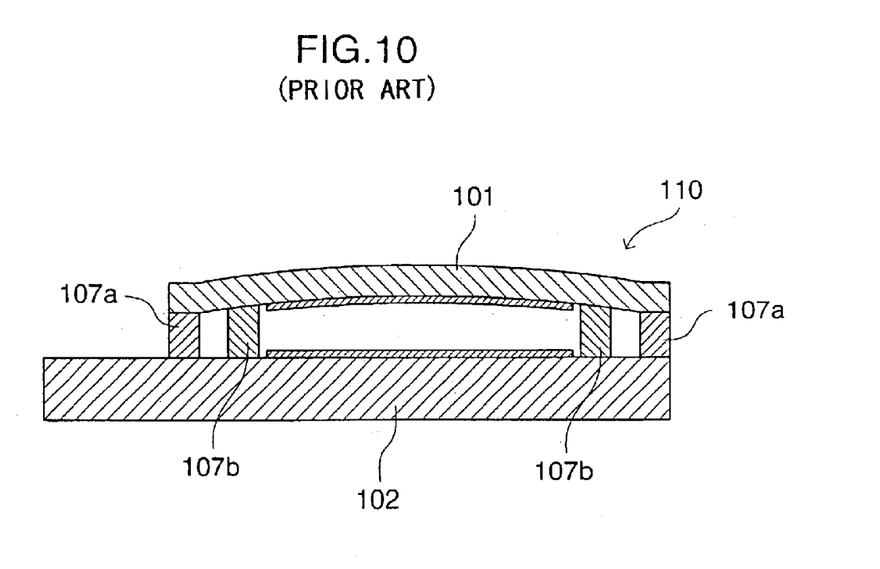
FIG. 10 is a sectional view illustrating a state where a plastic substrate of a liquid crystal display element is deformed to be bulged in a conventional production process.

As shown in FIG. 10, when a plastic substrate 101 is heated with its margin temporarily fixed by a seal member 107a of a UV curable resin, the plastic substrate 101 expands. At this time, the plastic substrate 101 cannot be displaced parallel to a glass substrate 102, but deforms perpendicularly to the glass substrate 102.

Since spacers are provided between the glass substrate 102 and the plastic substrate 101, the plastic substrate 101 deforms only in one direction (perpendicularly apart from the glass substrate 102). As a result, the plastic substrate 101 is bulged.

The glass substrate 102 and the plastic substrate 101 are fixed by a seal member 107b of a thermosetting resin with the plastic substrate 101 being in a bulged state. As a result, a spacing between the glass substrate 102 and the plastic substrate 101 increases in comparison with a predetermined spacing, as a distance from the UV curable resin seal member 107a increases. Therefore, the inter-substrate spacing cannot be kept uniform. This adversely affects the display quality of a display element 110.

Furthermore, the seal member 107b of the thermosetting resin often produces a gas component when it is cured. Where the gas component intrudes into a space defined by the seal member 107b, there is possibility that the display quality of the display element 110 is degraded.

SUMMARY OF THE INVENTION

In view of the foregoing, the present invention is directed to a display element and a production method therefor, by which a pair of substrates can be combined in a predetermined positional relationship at a predetermined spacing even if the substrates have significantly different linear expansion coefficients.

According to the present invention, there is provided a display element, which comprises a pair of substrates; a display layer provided between the substrates for performing a display operation; and a looped seal member provided between the substrates for enclosing the display layer between the substrates; the substrates having different linear expansion coefficients; the looped seal member comprising a plurality of resin layers stacked from an inner side to an outer side, at least one of the resin layers being composed of a thermosetting resin, the rest of the resin layers being composed of a UV curable resin.

In the present invention, the UV curable resin layer for temporarily fixing the pair of substrates and the thermosetting resin layer for finally fixing the pair of substrates are integrated into the seal member. Therefore, there is no spacing between the UV curable resin layer and the thermosetting resin layer, unlike the prior art in which the UV curable resin seal member and the thermosetting resin seal member are provided in a spaced relationship.

Even if the substrates to be combined have different linear expansion coefficients, there is no possibility that the substrates are finally fixed in a positional relationship different from an initial positional relationship of the substrates temporarily fixed by the UV curable resin seal member or finally fixed at a greater spacing than the predetermined spacing as in the prior art.

Since the UV curable resin layer and the thermosetting resin layer are not spaced from each other, the substrates are finally fixed in the same positional relationship as when the substrates are temporarily fixed at the predetermined spacing.

DESCRIPTION OF THE PREFERRED EMBODIMENTS

A display element according to the present invention comprises a pair of substrates; a display layer provided between the substrates for performing a display operation; and a looped seal member provided between the substrates for enclosing the display layer between the substrates; the substrates having different linear expansion coefficients; the looped seal member comprising a plurality of resin layers stacked from an inner side to an outer side, at least one of the resin layers being composed of a thermosetting resin, the rest of the resin layers being composed of a UV curable resin.

In the display element herein defined, the display layer is held between the substrates, and the periphery of the display layer is sealed with the seal member. The display layer for performing the display operation may be constructed so as to provide a plurality of pixels or to provide a single pixel.

In the present invention, the seal member defines a space for enclosing the display layer between the substrates.

In the present invention, the seal member includes the plurality of resin layers stacked from the inner side to the outer side. At least one of the resin layers is composed of the thermosetting resin, and the rest of the resin layers is composed of the UV curable resin.

The thermosetting resin is not particularly limited, and conventional thermosetting resins employed as sealing materials for display devices are usable. For example, a epoxy resin adhesive may be employed.

A so-called UV curable resin adhesive is typically employed as the UV curable resin. Preferred examples of the UV curable resin include LX1347 (rapidly curable type) available from Japan Lock Tight Co., Ltd., NOA-61 available from Norland Co., Ltd., and AVR-100 available from Three Bond Co., Ltd.

The substrates of the display element according to the present invention have different linear expansion coefficients. The combination of the substrates is not particularly limited, but examples thereof include a combination of a glass substrate and a glass substrate, a combination of a glass substrate and a plastic substrate, and a combination of a plastic substrate and a plastic substrate.

Among these combinations, the combination of the glass substrate and the plastic substrate is effective for use with the seal member for the display element according to the present invention, because the glass substrate and the plastic substrate have significantly different linear expansion coefficients.

Where the combination of the plastic substrates is employed, the plastic substrates may significantly differ in linear expansion coefficient which depends on materials for the plastic substrates. In this case, the seal member for the display element according to the present invention is effective. Of course, the seal member for the display element according to the present invention is also applicable to combinations of substrates which have the same or substantially the same linear expansion coefficient.

Exemplary materials for the glass substrates include borosilicate glass, soda/lime glass, weak alkaline glass, non-alkaline glass and silica glass.

The plastic substrates may be in a plate form or in a film form.

Examples of the plastic plate substrate include acrylic resin substrates having a thickness of about 0.4 mm.

Examples of the plastic film substrate include substrates of polycarbonates, polyarylates, polyether sulfones and polyimide resins having a thickness of about 0.05 mm to about 0.2 mm. A gas barrier layer of ethylene vinyl alcohol, polyvinyl alcohol or $SiO_x$ and a surface layer of an epoxy resin may respectively be provided on opposite surfaces of the plastic film substrate.

In the display element according to the present invention, the display layer may comprise one of a liquid crystal layer and an organic EL layer, and a pair of electrodes provided on opposite sides of the display layer for driving the display layer.

A liquid crystal for the liquid crystal layer is not particularly limited, but any of various known liquid crystals such as a smectic liquid crystal and a nematic liquid crystal may be employed.

Where the display element is of a transmissive type, known transparent electrodes such as of ITO may be employed as the pair of electrodes provided on the opposite sides of the liquid crystal layer. Where the display element is of a reflective type, an aluminum electrode and a transparent electrode may be employed in combination as the electrodes.

The organic EL layer may be of a single layer structure consisting of a light emitting layer alone, or of a multi-layer structure. Where the organic EL layer is of the multi-layer structure, the organic EL layer may have such a structure that a hole transporting sublayer and a light emitting sublayer are stacked in this order, that a hole injecting sublayer, a hole transporting sublayer and a light emitting sublayer are stacked in this order, or that a hole injecting sublayer, a hole transporting sublayer, a light emitting sublayer and an electron transporting sublayer are stacked in this order. Materials for the respective sublayers are not particularly limited, but any of various materials known to be employed as the materials for the organic EL layer may be employed.

A transparent electrode such as of ITO or $SnO_2$ and a negative electrode of a metal material having a smaller work function may be employed in combination as the pair of electrodes provided on the opposite sides of the organic EL layer. Examples of the metal material having a smaller work function include metals such as Ca, Ba, Al, Mg and Ag, and alloys such as Mg/Ag alloys, Al/Li alloys, Li/F alloys and Ca/F alloys.

In the display element according to the present invention, the seal member may be of a two-layer structure including an inner layer composed of the thermosetting resin, and an outer layer composed of the UV curable resin. Where the pair of substrates are combined with the use of the seal member having such a structure, the outer resin layer temporarily fixes the substrates to prevent lateral offset of the substrates, and the inner resin layer finally fixes the substrates.

Where the heat expansion coefficients of the substrates are significantly different, one of the substrates having a greater linear expansion coefficient is expanded to be bulged by heat applied for curing the inner resin layer, but portions of the substrates temporarily fixed by the outer resin layer are kept at a predetermined spacing.

The substrates are finally fixed by the inner resin layer located in substantially the same position as the outer resin layer. Therefore, when the substrates expanded by the heat are contracted to the initial size after the inner resin layer is completely cured, the substrates are accurately combined in a predetermined positional relationship at the predetermined spacing.

In the display element according to the present invention, it is preferable that the seal member is of a two-layer structure including an inner layer composed of the UV curable resin and an outer layer composed of the thermosetting resin. Where the pair of substrates are combined with the use of the seal member having such a structure, the inner resin layer temporarily fixes the substrates to prevent lateral offset of the substrates, and the outer resin layer finally fixes the substrates. Therefore, the substrates are accurately combined in a predetermined positional relationship at a predetermined spacing, as in the case where the aforesaid seal member is employed.

Since the two-layer structure includes the inner layer composed of the UV curable resin and the outer layer composed of the thermosetting resin, a gas component produced from the outer layer composed of the thermosetting resin does not intrude into the space defined by the seal member when the outer layer is cured, but is discharged outwardly of the space defined by the seal member.

Therefore, degradation of the display quality of the display element can be prevented which may otherwise occur due to intrusion of the gas component into the space.

Since the thermosetting resin layer for finally fixing the substrates is located on the outer side, separation of the inner and outer resin layers is prevented which may otherwise occur when contraction stresses occurring in the substrates are concentrated on the seal member. In this case, the thermosetting resin layer is required to withstand contraction forces of the substrates after the curing thereof, because the thermosetting resin layer is cured with the substrates being in an expanded state.

However, an inner portion of the looped seal member has a greater area than an outer portion of the looped seal member when the combined substrates are viewed in plan, so that the inner portion receives greater contraction stresses. Where the thermosetting resin layer is provided on the outer side rather than on the inner side of the seal member having the two-layer structure, the contraction stresses are reduced, so that the separation of the inner layer and the outer layer can be prevented.

In the display element according to the present invention, it is preferable that the seal member is of a three-layer structure including an intermediate layer composed of the thermosetting resin and inner and outer layers each composed of the UV curable resin.

Where the pair of substrates are combined with the use of the seal member having such a structure, the inner and outer resin layers temporarily fix the substrates to prevent lateral offset of the substrates, and the intermediate resin layer finally fixes the substrates. Therefore, the substrates are accurately combined in a predetermined positional relationship at a predetermined spacing, as in the case where the aforesaid seal member is employed.

Since the thermosetting resin layer is sandwiched between the UV curable resin layers in the seal member having the aforesaid structure, contraction stresses exerted on the thermosetting resin layer are minimized. As a result, the intermediate resin layer is prevented from being separated from the inner and outer resin layers.

Where the seal member has the two-layer structure in which the outer resin layer is composed of the thermosetting resin, there is a possibility that margins of the substrates around the seal member are slightly warped after the substrates are finally fixed by the thermosetting resin layer.

More specifically, the margins of the substrates around the seal member are expanded outwardly by heat applied for curing the thermosetting resin layer of the seal member, but the thermosetting resin layer follows the expansion of the substrates and is cured with the substrates being in the expanded state. When the substrates are thereafter cooled to the ordinary temperature, the substrates are contracted. At this time, stresses are applied to portions of the substrates fixed by the thermosetting resin layer to return the thermosetting resin layer to an initial position, whereby the margins of the substrates around the seal member are warped.

However, the seal member of the three-layer structure having the intermediate thermosetting resin layer provided between the UV curable resin layers can suppress the warp of the margins of the substrates around the seal member.

That is, opposite sides of the thermosetting resin layer of the seal member having the three-layer structure are already fixed to the substrates by the UV curable resin layers when the heat is applied for curing the thermosetting resin layer. The movement of portions of the substrates in contact with the thermosetting resin layer is restricted even if the substrates are expanded. Therefore, the movement of the thermosetting resin layer following the expansion of the substrates can be minimized. As a result, almost no stress is exerted on the thermosetting resin layer when the substrates are cooled to the ordinary temperature thereby to be contracted. Hence, the warp of the margins of the substrates around the seal member can be prevented.

In the display element according to the present invention, it is preferable that the outer layer of the seal member having the three-layer structure is formed into a discontinuous structure with gaps.

With this arrangement, the gas component produced from the intermediate layer composed of thermosetting resin is outwardly discharged through the gaps of the outer layer when the intermediate layer is cured.

In accordance with another aspect of the present invention, there is provided a production method for the aforesaid inventive display element, which comprises the steps of: forming a looped seal member on a surface of a first substrate, the looped seal member comprising a plurality of resin layers stacked from an inner side to an outer side, at least one of the resin layers being composed of a thermosetting resin, the rest of the resin layers being composed of a UV curable resin; combining a second substrate with the first substrate in an opposed relationship with the seal member held between the first substrate and the second substrate; irradiating the seal member with a UV radiation to cure the UV curable resin layer; heating the seal member to cure the thermosetting resin layer; and providing a display layer for performing a display operation in a space defined by the first and second substrates and the seal member.

In the production method according to the present invention, the first and second substrates may have different linear expansion coefficients. In this case, the production method may further comprise the step of providing a connection terminal on one of the first and second substrates which has a smaller linear expansion coefficient for connection to a driving circuit for driving the display layer. With this arrangement, the connection terminal is prevented from being damaged where the first and second substrates have different linear expansion coefficients.

In the seal member forming step of the production method according to the present invention, the seal member may be formed on the surface of the first substrate into a structure such that an outer resin layer thereof is discontinuous with gaps.

Particularly where the seal member is of a three-layer structure including an intermediate layer composed of the thermosetting resin and inner and outer layers composed of the UV curable resin, the gas component produced from the intermediate layer does not intrude into the space defined by the seal member, but is outwardly discharged through the gaps of outer layer when the intermediate layer is cured.

Thus, the curing of the intermediate layer can be promoted, and degradation of the display quality of the display element can be prevented which may otherwise occur due to intrusion of the gas component into the space.

In the seal member forming step of the production method according to the present invention, a plurality of looped seal members may be formed on the surface of the first substrate. In this case, the production method further comprises the step of dividing the combined first and second substrates into regions defined by the respective seal members. With this arrangement, a plurality of display elements can simultaneously be produced for improvement of the production efficiency.

In accordance with further another aspect of the present invention, there is provided a production method for the aforesaid inventive display element, which comprises the steps of: forming a display layer between a first substrate and a second substrate opposed each other; and forming a looped seal member between the first and second substrates to seal the first and second substrates, the looped seal member comprising a plurality of resin layers stacked from an inner side to an outer side, at least one of the resin layers being composed of a thermosetting resin, the rest of the resin layers being composed of a UV curable resin; wherein the step of forming the seal member includes irradiating the seal member with a UV radiation to cure the UV curable resin layer and heating the seal member to cure the thermosetting resin layer.

With reference to the attached drawings, the present invention will hereinafter be described in detail by way of embodiments thereof. However, it should be understood that the invention be not limited to these embodiments. In the embodiments to be hereinafter described, like components are denoted by like reference characters.

First Embodiment

A display element according to a first embodiment of the present invention will be described with reference to FIG. 1, which is a sectional view schematically illustrating the construction of the display element (liquid crystal display element) according to the first embodiment.

Figure 1:
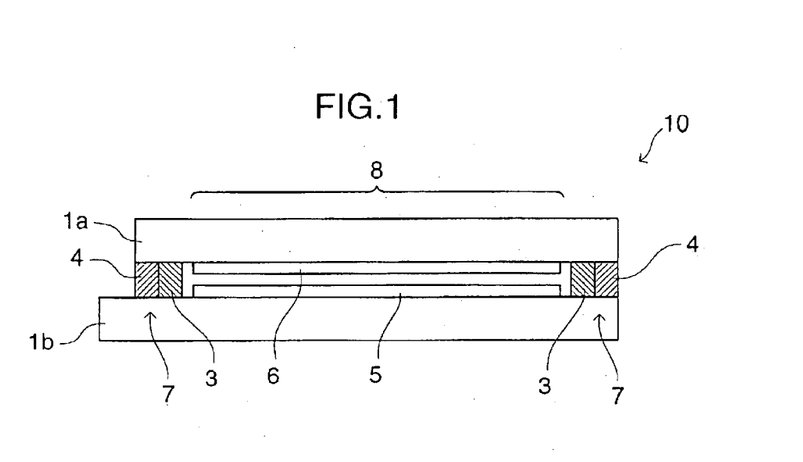
FIG. 1 is a sectional view schematically illustrating the construction of a liquid crystal display element according to a first embodiment of the present invention.

As shown in FIG. 1, the liquid crystal display element 10 of the first embodiment includes a pair of plastic film substrates 1a, 1b, a display layer (not shown) held between the plastic film substrates 1a and 1b for performing a display operation, and a looped seal member 7 provided between the plastic film substrates 1a and 1b for enclosing the display layer between the plastic film substrates 1a and 1b.

The plastic film substrates 1a, 1b have different linear expansion coefficients. The looped seal member 7 includes resin layers 3, 4 stacked from an inner side to an outer side. The resin layer 3 is composed of a thermosetting resin, and the resin layer 4 is composed of a UV curable resin.

More specifically, the plastic film substrate 1a is a PES (polyether sulfone) film having a thickness of about 0.2 mm, and the plastic film substrate 1b is a polyimide resin film (e.g., Dupont's CAPTON FILM composed of a polyimide resin and having a lower linear expansion coefficient) having a thickness of about 2 mm.

An electrode pattern 5 is provided on the plastic film substrate 1b. The electrode pattern 5 principally includes a plurality of pixel electrodes (not shown) of ITO (indium tin oxide) formed on the plastic film substrate 1b. The pixel electrodes respectively have TFTs (not shown).

The TFTs each include a gate electrode provided on the substrate, an insulating film covering the gate electrode, semiconductor layers provided in an island pattern on the insulating film, and a source electrode and a drain electrode provided in contact with the respective semiconductor layers. The gate electrode, the source electrode and the drain electrode are composed of tantalum. The insulating film is composed of silicon nitride. The semiconductor layers are laminate films each including an intrinsic amorphous silicon layer and an $n^+$-amorphous silicon layer doped with an impurity.

The gate electrode of each of the TFTs is connected to a gate interconnection (not shown). The source electrode is connected to a source interconnection (not shown), and the drain electrode is connected to a pixel electrode.

Rib-like spacers (not shown) are provided on the plastic film substrate 1b. The rib-like spacers are fixed onto the plastic film substrate 1b. Formation of the rib-like spacers is achieved by applying a photosensitive resin on the plastic film substrate 1b and patterning the resulting photosensitive resin layer by a photolithography method.

A reason why the rib-like spacers are used instead of ordinary plastic beads as spacers is as follows.

The plastic film substrates 1a, 1b employed in the first embodiment have different linear expansion coefficients. Therefore, a spacing between the substrates is increased when the substrates are expanded by heat applied thereto in a substrate combining step. Where the plastic beads are employed as the spacers, the beads move with respect to the substrates when the inter-substrate spacing is increased. This makes it difficult to keep the inter-substrate spacing uniform.

On the contrary, the rib-like spacers are fixed onto one of the substrates, so that the positions of the spacers relative to the substrates are not changed even if the inter-substrate spacing is changed. Therefore, the rib-like spacers are advantageous where the substrates have different linear expansion coefficients.

A color filter 6 is provided on the plastic film substrate 1a. The color filter 6 includes red (R), green (G) and blue (B) color layers arranged in a stripe pattern, strip-shaped black matrix (BM) layers provided along boundaries of the respective color layers, and an overcoat (OC) layer covering the respective color layers and the BM layers.

The OC layer is provided for planarization of the surface of the color filter. Counter electrodes (not shown) of ITO are provided on the OC layer.

With the electrode pattern 5 and the color filter 6 positioned in a predetermined opposed relationship, the plastic film substrates 1a, 1b are combined with the intervention of the seal member 7.

The seal member 7 is provided along the periphery of a display region 8. The thermosetting resin layer 3 and the UV curable resin layer 4 of the seal member 7 are stacked from the inner side to the outer side.

In the first embodiment, the plastic film substrates 1a, 1b are temporarily fixed by photo-curing the UV curable resin layer 4, and finally fixed (or combined) by heat-setting the thermosetting resin layer 3. By curing the seal member 7 having the aforesaid structure in the aforesaid manner, the plastic film substrates 1a, 1b are accurately combined in a predetermined positional relationship at a predetermined spacing. As a result, the liquid crystal display element 10 has an excellent display quality.

A production method for the liquid crystal display element according to the first embodiment will be described with reference to FIG. 1.

First, an explanation will be given to the step of forming an electrode pattern 5 and rib-like spacers on a plastic film substrate 1b.

A thin tantalum film is first formed on the plastic film substrate 1b by a sputtering method. Then, the thin film thus formed is patterned by a photolithography method for formation of a plurality of gate interconnections and a plurality of gate electrodes connected to the respective gate interconnections. Further, insulating films of silicon nitride are formed as covering the respective gate electrodes.

Next, an intrinsic amorphous silicon layer is formed over the insulating films by a CVD method, and then an $n^+$-amorphous silicon layer doped with an impurity is formed on the intrinsic amorphous silicon layer by a CVD method. Subsequently, the intrinsic amorphous silicon layer and the $n^+$-amorphous silicon layer are patterned in an island pattern by a photolithography method.

Then, source interconnections and source and drain electrodes connected to the source interconnections are formed of tantalum in the same manner as the formation of the gate interconnections and the gate electrodes. At this time, portions of the $n^+$-amorphous silicon layer present between the source electrodes and the drain electrodes are etched away by using the source and drain electrodes as a mask for formation of channel regions. Thus, TFTs are formed as switching elements in the vicinity of intersections between the gate interconnections and the source interconnections.

Subsequently, an ITO film is formed as a transparent conductive film by a sputtering method, and patterned by a photolithography method for formation of a plurality of pixel electrodes. The pixel electrodes are electrically connected to the gate interconnections and the source interconnections via the TFTs previously formed. Then, a photosensitive resin is applied on the plastic film substrate 1b, and the resulting photosensitive resin layer is patterned by a photolithography method for formation of the rib-like spacers.

Next, an explanation will be given to the step of forming a color filter 6 and counter electrodes on a plastic film substrate 1a.

A color resist layer is formed on the plastic film substrate 1a, and patterned by a photolithography method. This process is repeated for R, G and B colors. Thus, the color filter 6 is formed, in which R, G and B color layers are arranged in a stripe pattern.

Then, strip-shaped black matrix (BM) layers are formed along boundaries of the R, G and B color layers by a back surface exposure method using the R, G and B color layers as a mask. Thereafter, an overcoat (OC) layer is formed as covering the R, G and B color layers and the BM layers for planarization of the surface of the color filter. Then, an ITO film is formed on the OC layer by a sputtering method, and patterned by a photolithography method for formation of the counter electrodes.

Next, an explanation will be given to the step of combining the plastic film substrates 1a, 1b with the intervention of a seal member 7.

First, alignment films (not shown) are formed on opposed surfaces of the plastic film substrates 1a, 1b by a flexible printing method, and subjected to an orientation process by a rubbing method. Then, a thermosetting resin is applied in a loop along the periphery of a display region 8 on the plastic film substrate 1a by a dispenser method for formation of a thermosetting resin layer 3. Further, a UV curable resin is applied in a loop along the outer periphery of the resin layer 3 (as surrounding the resin layer 3) by a dispenser method for formation of a UV curable resin layer 4. Thus, an uncured seal member 7 is formed on the plastic film substrate 1a.

The thermosetting resin and the UV curable resin are applied to a width of about 0.3 mm and a thickness of about 20 $\mu$m. The thermosetting resin and the UV curable resin each contain spherical spacers in a proportion of about 2 wt %. The spherical spacers contained in the thermosetting resin and in the UV curable resin have the same diameter.

Although the thermosetting resin and the UV curable resin are applied on the plastic film substrate 1a in the first embodiment, the thermosetting resin and the UV curable resin may be applied on the plastic film substrate 1b. Alternatively, the thermosetting resin may be applied on one of the substrates and the UV curable resin may be applied on the other substrate, so that the thermosetting resin layer 3 and the UV curable resin layer 4 are stacked from the inner side to the outer side when the substrates are combined.

Since it is merely necessary to stack the thermosetting resin layer 3 and the UV curable resin layer 4 from the inner side to the outer side with the substrates being in a combined state, the patterns of the thermosetting resin and the UV curable resin to be applied are not particularly limited. The method for the application of the resins is not limited to the aforesaid dispenser method, but a printing method such as an offset printing method may be employed.

Then, the plastic film substrates 1a, 1b are opposed to each other (or combined), so that the electrode pattern 5 on the plastic film substrate 1b and the color filter 6 on the plastic film substrate 1a are positioned in a predetermined opposed relation. Thus, the seal member 7 provided on the plastic film substrate 1a is held between the plastic film substrates 1a and 1b.

In this state, the UV curable resin layer 4 is irradiated with a UV radiation by means of a UV press apparatus (not shown) thereby to be cured for temporarily fixing the plastic film substrates 1a, 1b. A metal halide lamp is employed as a light source for the UV irradiation.

Subsequently, the plastic film substrates 1a, 1b thus combined are heated up to about 140° C. and, after the thermosetting resin layer 3 is completely cured, the plastic film substrates 1a, 1b are gradually cooled to the ordinary temperature. Thus, the plastic film substrates 1a, 1b are accurately combined in a predetermined positional relationship at a predetermined spacing.

In the step of curing the thermosetting resin layer 3, the plastic film substrate 1a is expended and contracted to a greater extent than the plastic film substrate 1b. However, a stress occurring at this time is prevented from causing a strain in the liquid crystal display element.

Thereafter, a liquid crystal is injected into a space defined by the plastic film substrates 1a, 1b combined with the intervention of the seal member 7. Thus, the liquid crystal display element 10 is completed.

It is noted that the seal member 7 according to the first embodiment is applicable to a case where a plurality of liquid crystal display elements are simultaneously produced by employing a pair of mother substrates.

Second Embodiment

A display element according to a second embodiment of the present invention will be described with reference to FIG. 2, which is a sectional view schematically illustrating the construction of the display element (liquid crystal display element) according to the second embodiment.

Figure 2:
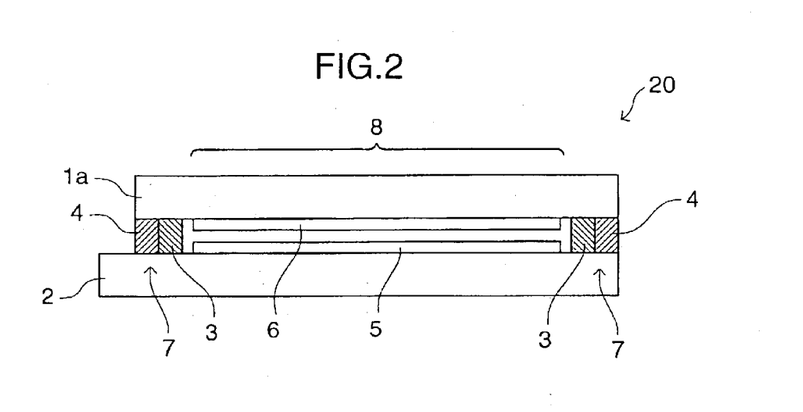
FIG. 2 is a sectional view schematically illustrating the construction of a liquid crystal display element according to a second embodiment of the present invention.

As shown in FIG. 2, the liquid crystal display element 20 of the second embodiment includes a glass substrate 2 and a plastic film substrate 1a, a display layer (not shown) held between the glass substrate 2 and the plastic film substrate 1a for performing a display operation, and a looped seal member 7 provided between the glass substrate 2 and the plastic film substrate 1a for enclosing the display layer between the glass substrate 2 and the plastic film substrate 1a.

The glass substrate 2 and the plastic film substrate 1a have different linear expansion coefficients. The looped seal member 7 includes resin layers 3, 4 stacked from an inner side to an outer side. The resin layer 3 is composed of a thermosetting resin, and the resin layer 4 is composed of a UV curable resin.

More specifically, the plastic film substrate 1a is a PES (polyether sulfone) film having a thickness of about 0.2 mm, and the glass substrate 2 is composed of a non-alkaline glass and has a thickness of about 0.7 mm.

An electrode pattern 5 is provided on the glass substrate 2. The electrode pattern 5 includes a plurality of pixel electrodes (not shown) of ITO (indium tin oxide) formed on the glass substrate 2. The pixel electrodes respectively have TFTs (not shown).

The TFTs each include a gate electrode provided on the substrate, an insulating film covering the gate electrode, semiconductor layers provided in an island pattern on the insulating film, and a source electrode and a drain electrode provided in contact with the respective semiconductor layers. The gate electrode, the source electrode and the drain electrode are composed of tantalum. The insulating film is composed of silicon nitride. The semiconductor layers are laminate films each including an intrinsic amorphous silicon layer and an n$^+$-amorphous silicon layer doped with an impurity.

The gate electrode of each of the TFTs is connected to a gate interconnection (not shown). The source electrode is connected to a source interconnection (not shown), and the drain electrode is connected to a pixel electrode.

Rib-like spacers (not shown) are provided on the glass substrate 2. The rib-like spacers are fixed onto the glass substrate 2. Formation of the rib-like spacers is achieved by applying a photosensitive resin on the glass substrate 2 and patterning the resulting photosensitive resin layer by a photolithography method.

A reason why the rib-like spacers are used instead of ordinary plastic beads as spacers is as follows.

The glass substrate 2 and the plastic film substrate 1a employed in the second embodiment have different linear expansion coefficients. Therefore, a spacing between the substrates is increased when the substrates are expanded by heat applied thereto in a substrate combining step. Where the plastic beads are employed as the spacers, the beads move with respect to the substrates when the inter-substrate spacing is increased. This makes it difficult to keep the inter-substrate spacing uniform.

On the contrary, the rib-like spacers are fixed onto the glass substrate, so that the positions of the spacers relative to the substrates are not changed even if the inter-substrate spacing is changed. Therefore, the rib-like spacers are advantageous where the substrates have different linear expansion coefficients.

A color filter 6 is provided on the plastic film substrate 1a. The color filter 6 includes red (R), green (G) and blue (B) color layers arranged in a stripe pattern, strip-shaped black matrix (BM) layers provided along boundaries of the respective color layers, and an overcoat (OC) layer covering the respective color layers and the BM layers.

The OC layer is provided for planarization of the surface of the color filter. Counter electrodes (not shown) of ITO are provided on the OC layer.

With the electrode pattern 5 and the color filter 6 positioned in a predetermined opposed relationship, the plastic film substrate 1a and the glass substrate 2 are combined with the intervention of the seal member 7.

The seal member 7 is provided along the periphery of a display region 8. The thermosetting resin layer 3 and the UV curable resin layer 4 of the seal member 7 are stacked from the inner side to the outer side.

In the second embodiment, the glass substrate 2 and the plastic film substrate 1a are temporarily fixed by photo-curing the UV curable resin layer 4, and finally fixed (or combined) by heat-setting the thermosetting resin layer 3. By curing the seal member 7 having the aforesaid structure in the aforesaid manner, the glass substrate 2 and the plastic film substrate 1a are accurately combined in a predetermined positional relationship at a predetermined spacing. As a result, the liquid crystal display element 20 has an excellent display quality.

A production method for the liquid crystal display element according to the second embodiment will be described with reference to FIG. 2.

First, an explanation will be given to the step of forming an electrode pattern 5 and rib-like spacers on a glass substrate 2.

A thin tantalum film is first formed on the glass substrate 2 by a sputtering method. Then, the thin film thus formed is patterned by a photolithography method for formation of a plurality of gate interconnections and a plurality of gate electrodes connected to the respective gate interconnections. Further, insulating films of silicon nitride are formed as covering the respective gate electrodes.

Next, an intrinsic amorphous silicon layer is formed over the insulating films by a CVD method, and then an $n^{+}$-amorphous silicon layer doped with an impurity is formed on the intrinsic amorphous silicon layer by a CVD method. Subsequently, the intrinsic amorphous silicon layer and the $n^{+}$-amorphous silicon layer are patterned in an island pattern by a photolithography method.

Then, source interconnections and source and drain electrodes connected to the source interconnections are formed of tantalum in the same manner as the formation of the gate interconnections and the gate electrodes. At this time, portions of the $n^{+}$-amorphous silicon layer present between the source electrodes and the drain electrodes are etched away by using the source and drain electrodes as a mask for formation of channel regions. Thus, TFTs are formed as switching elements in the vicinity of intersections between the gate interconnections and the source interconnections.

Subsequently, an ITO film is formed as a transparent conductive film by a sputtering method, and patterned by a photolithography method for formation of a plurality of pixel electrodes. The pixel electrodes are electrically connected to the gate interconnections and the source interconnections via the TFTs previously formed. Then, a photosensitive resin is applied on the glass substrate 2, and the resulting photosensitive resin layer is patterned by a photolithography method for formation of the rib-like spacers.

Next, an explanation will be given to the step of forming a color filter 6 and counter electrodes on a plastic film substrate 1a.

A color resist layer is formed on the plastic film substrate 1a, and patterned by a photolithography method. This process is repeated for R, G and B colors. Thus, the color filter 6 is formed, in which R, G and B color layers are arranged in a stripe pattern.

Then, strip-shaped black matrix (BM) layers are formed along boundaries of the R, G and B color layers by a back surface exposure method using the R, G and B color layers as a mask. Thereafter, an overcoat (OC) layer is formed as covering the R, G and B color layers and the BM layers for planarization of the surface of the color filter. Then, an ITO film is formed on the OC layer by a sputtering method, and patterned by a photolithography method for formation of the counter electrodes.

Next, an explanation will be given to the step of combining the glass substrate 2 and the plastic film substrates 1a with the intervention of a seal member 7.

First, alignment films (not shown) are formed on opposed surfaces of the glass substrate 2 and the plastic film substrate 1a by a flexible printing method, and subjected to an orientation process by a rubbing method. Then, a thermosetting resin is applied in a loop along the periphery of a display region 8 on the plastic film substrate 1a by a dispenser method for formation of a thermosetting resin layer 3. Further, a UV curable resin is applied in a loop along the outer periphery of the resin layer 3 (as surrounding the resin layer 3) by a dispenser method for formation of a UV curable resin layer 4. Thus, an uncured seal member 7 is formed on the plastic film substrate 1a.

The thermosetting resin and the UV curable resin are applied to a width of about 0.3 mm and a thickness of about 20 $\mu$m. The thermosetting resin and the UV curable resin each contain spherical spacers in a proportion of about 2 wt %. The spherical spacers contained in the thermosetting resin and in the UV curable resin have the same diameter.

Although the thermosetting resin and the UV curable resin are applied on the plastic film substrate 1a in the second embodiment, the thermosetting resin and the UV curable resin may be applied on the glass substrate 2. Alternatively, the thermosetting resin may be applied on one of the substrates and the UV curable resin may be applied on the other substrate, so that the thermosetting resin layer 3 and the UV curable resin layer 4 are stacked from the inner side to the outer side when the substrates are combined.

Since it is merely necessary to stack the thermosetting resin layer 3 and the UV curable resin layer 4 from the inner side to the outer side with the substrates being in a combined state, the patterns of the thermosetting resin and the UV curable resin to be applied are not particularly limited. The method for the application of the resins is not limited to the aforesaid dispenser method, but a printing method such as an offset printing method may be employed.

Then, the glass substrate 2 and the plastic film substrate 1a are opposed to each other (or combined), so that the electrode pattern 5 on the glass substrate 2 and the color filter 6 on the plastic film substrate 1a are positioned in a predetermined opposed relation. Thus, the seal member 7 provided on the plastic film substrate 1a is held between the glass substrate 2 and the plastic film substrate 1a.

In this state, the UV curable resin layer 4 is irradiated with a UV radiation by means of a UV press apparatus (not shown) thereby to be cured for temporarily fixing the glass substrate 2 and the plastic film substrate 1a. A metal halide lamp is employed as a light source for the UV irradiation.

Subsequently, the glass substrate 2 and the plastic film substrate 1a thus combined are heated up to about 140° C. and, after the thermosetting resin layer 3 is completely cured, the substrates are gradually cooled to the ordinary temperature. Thus, the glass substrate 2 and the plastic film substrate 1a are accurately combined in a predetermined positional relationship at a predetermined spacing.

In the step of curing the thermosetting resin layer 3, the plastic film substrate 1a is expended and contracted to a greater extent than the glass substrate 2. However, a stress occurring at this time is prevented from causing a strain in the liquid crystal display element.

Thereafter, a liquid crystal is injected into a space defined by the glass substrate 2 and the plastic film substrate 1a combined with the intervention of the seal member 7. Thus, the liquid crystal display element 20 is completed.

It is noted that the seal member 7 according to the second embodiment is applicable to a case where a plurality of liquid crystal display elements are simultaneously produced by employing a pair of mother substrates.

Third Embodiment

Figure 3:
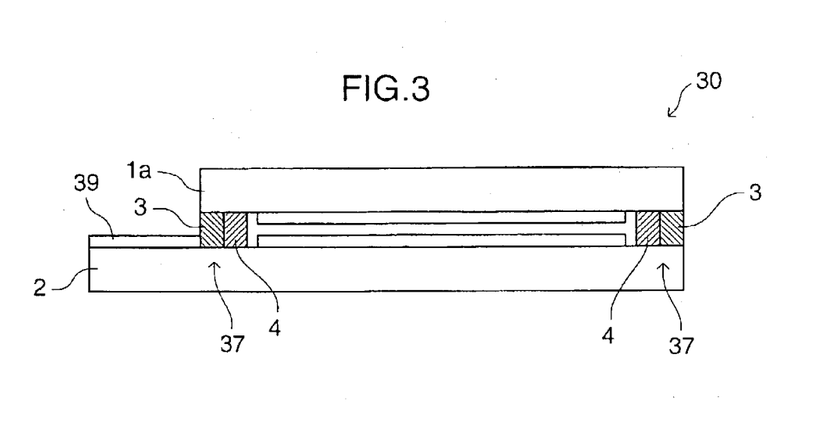
FIG. 3 is a sectional view schematically illustrating the construction of a liquid crystal display element according to a third embodiment of the present invention.
Figure 4:
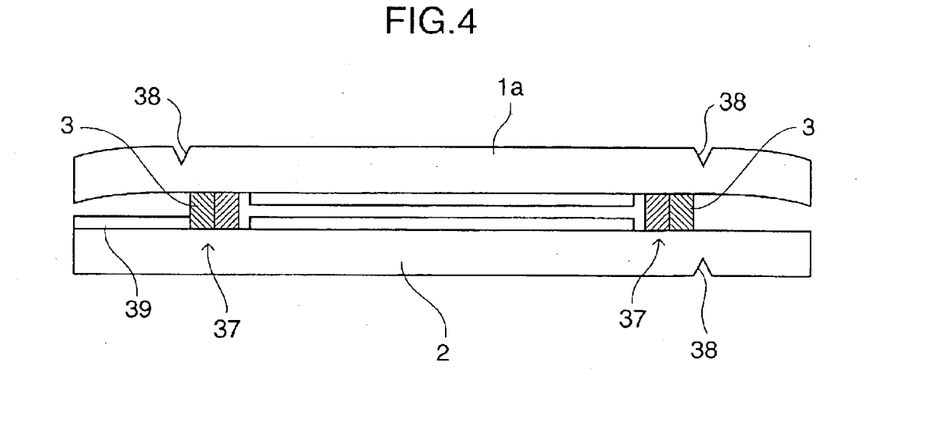
FIG. 4 is a sectional view illustrating a state where a margin of a plastic film substrate around a seal member is warped in a process for producing the liquid crystal display element according to the third embodiment.
Figure 5:
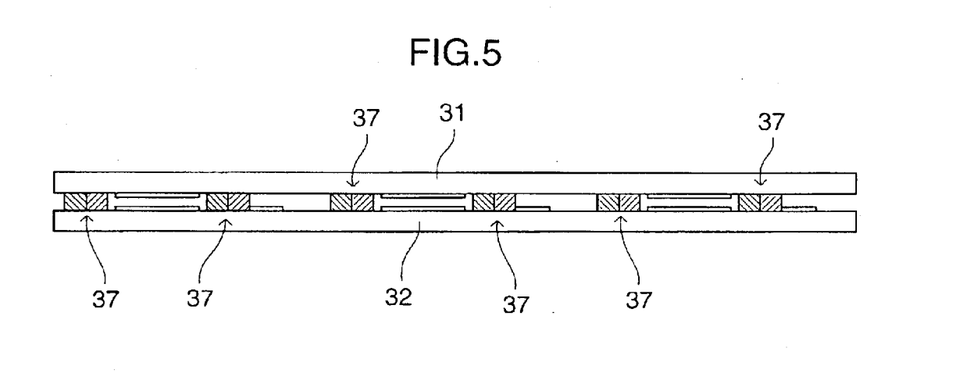
FIG. 5 is a sectional view illustrating the arrangement of seal members in a case where a pair of mother substrates are employed for simultaneously producing a plurality of liquid crystal display elements according to the third embodiment.

A liquid crystal display element according to a third embodiment will be described with reference to FIGS. 3 to 5. FIG. 3 is a sectional view schematically illustrating the construction of the liquid crystal display element according to the third embodiment, and FIG. 4 is a sectional view illustrating a state where a margin of a plastic film substrate around a seal member is warped in a process for producing the liquid crystal display element according to the third embodiment. FIG. 5 is a sectional view illustrating the arrangement of seal members in a case where a pair of mother substrates are employed for simultaneously producing a plurality of liquid crystal display elements according to the third embodiment.

As shown in FIG. 3, the liquid crystal display element 30 according to the third embodiment has substantially the same construction as the liquid crystal display element 20 (see FIG. 2) according to the second embodiment, except that a seal member 37 thereof is different in structure from the seal member 7 of the liquid crystal display element 20 and connection terminals 39 for connection to a driving circuit (not shown) are provided on the glass substrate 2.

As shown in FIG. 3, the seal member 37 of the liquid crystal display element 30 according to the third embodiment includes a UV curable resin layer 4 provided on an inner side and a thermosetting resin layer 3 provided on an outer side. Therefore, the UV curable-resin layer 4 on the inner side is first cured and the thermosetting resin layer 3 on the outer side is finally cured when the glass substrate 2 and the plastic film substrate 1a are combined.

With the use of the seal member 37 having such a structure, separation of the thermosetting resin layer 3 and the UV curable resin layer 4 can be prevented which may otherwise occur when a contraction stress occurring in the plastic film substrate 1a is concentrated on the seal member 37.

In the third embodiment, the connection terminals 39 for connection to the driving circuit (not shown) are provided on the glass substrate 2 having a smaller linear expansion coefficient.

Where the glass substrate 2 and the plastic film substrate 1a are combined with the use of the seal member 37 according to the third embodiment, a margin of the plastic film substrate 1a around the seal member 37 is slightly warped as shown in FIG. 4 after the thermosetting resin layer 3 is cured.

In the third embodiment, however, the plastic film substrate 1a is cut along dicing lines 38 (see FIG. 4) in the vicinity of the warped portion thereof in the step of leading out the connection terminals 39 (in the step of exposing the connection terminals to the outside). Therefore, there is no possibility that the connection terminals 39 provided on the glass substrate 2 are damaged by edges of the warped plastic film substrate 1a.

The seal member 37 according to the third embodiment is applicable to a case where a plurality of liquid crystal display elements are produced by employing a pair of mother substrates. In this case, seal members each having the aforesaid structure are arranged as shown in FIG. 5, and the pair of mother substrates 31, 32 are combined. Thereafter, the combined the pair of mother substrates 31, 32 are divided into regions defined by the respective seal members 37.

Fourth Embodiment

Figure 6:
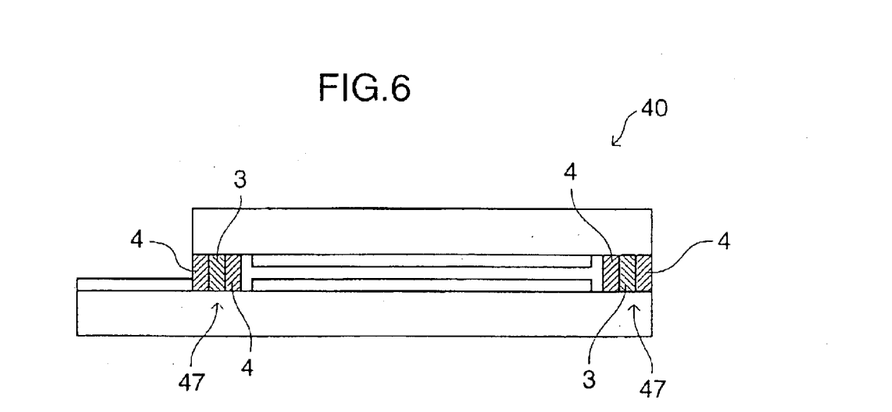
FIG. 6 is a sectional view schematically illustrating the construction of a liquid crystal display element according to a fourth embodiment of the present invention.

A liquid crystal display element according to a fourth embodiment will be described with reference to FIGS. 6 and 7. FIG. 6 is a sectional view schematically illustrating the construction of the liquid crystal display element according to the fourth embodiment, and FIG. 7 is a sectional view schematically illustrating a state where a pair of mother substrates are combined in a process for producing liquid crystal display elements according to the fourth embodiment.

The crystal display elements 40 according to the fourth embodiment each have substantially the same construction as the liquid crystal display element 20 (see FIG. 2), except that a seal member 47 thereof is different in structure from the seal member 7 of the liquid crystal display element 20. In a production process for the crystal display elements 40, a pair of mother substrates 41, 42 are employed.

As shown in FIG. 6, the seal members 47 employed in the fourth embodiment each have a three-layer structure including an inner UV curable resin layer 4, an intermediate thermosetting resin layer 3 and an outer UV curable resin layer 4.

Figure 7:
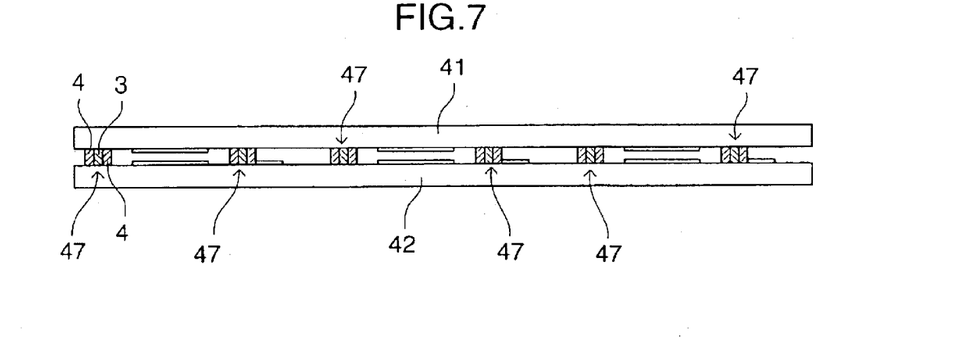
FIG. 7 is a sectional view schematically illustrating a state where a pair of mother substrates are combined in a process for producing liquid crystal display elements according to the fourth embodiment.

When the mother substrate 42 (glass substrate) and the mother substrate 41 (plastic film substrate) are combined as shown in FIG. 7, the inner and outer UV curable resin layers 4 of the seal members 47 are first cured, and then the intermediate thermosetting resin layers 3 of the seal members 47 are cured.

With the use of the seal members 47 having such a structure, the separation of the thermosetting resin layers 3 and the UV curable resin layers 4 can be prevented which may otherwise occur when contraction stresses occurring in the mother substrate 41 are concentrated on the seal members 47. Further, the warp of portions of the plastic film substrate around the seal members 47 can be prevented as in the third embodiment.

When the thermosetting resin layers 3 are cured for combining the pair of mother substrates 41, 42 with the intervention of the seal members 47 according to the fourth embodiment, opposite sides of the thermosetting resin layers 3 are already fixed to the mother substrates 41, 42 by the UV curable resin layers 4. Therefore, the movement of portions of the mother substrate 41 in contact with the thermosetting resin layers 3 is restricted even if the mother substrate 41 is expanded. Therefore, the movement of the thermosetting resin layers 3 following the expansion of the mother substrate 41 can be minimized.

As a result, almost no stress is exerted on the thermosetting resin layers 3 when the plastic film mother substrate 41 is cooled to the ordinary temperature thereby to be contracted. Therefore, the warp of portions of the mother substrate 41 around the respective seal members 47 (the warp of portions of the mother substrate 41 between adjacent pairs of seal members 47) can be prevented.

The seal member 47 according to the fourth embodiment is applicable to a case where a single liquid crystal display element is produced by employing a pair of substrates.

Fifth Embodiment

Figure 8:
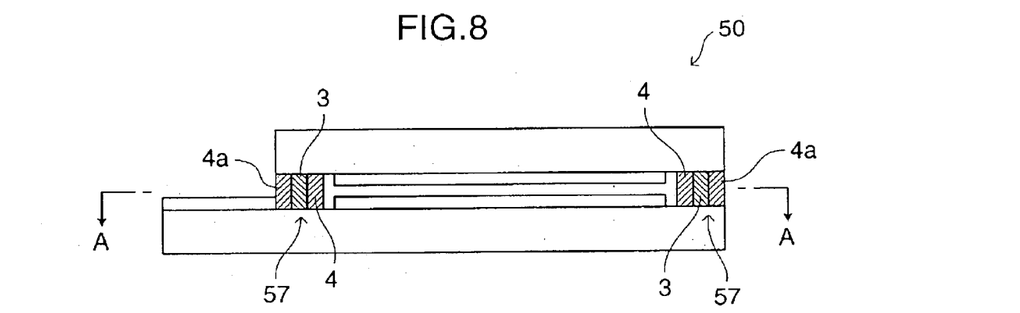
FIG. 8 is a sectional view schematically illustrating the construction of a liquid crystal display element according to a fifth embodiment of the present invention.
Figure 9:
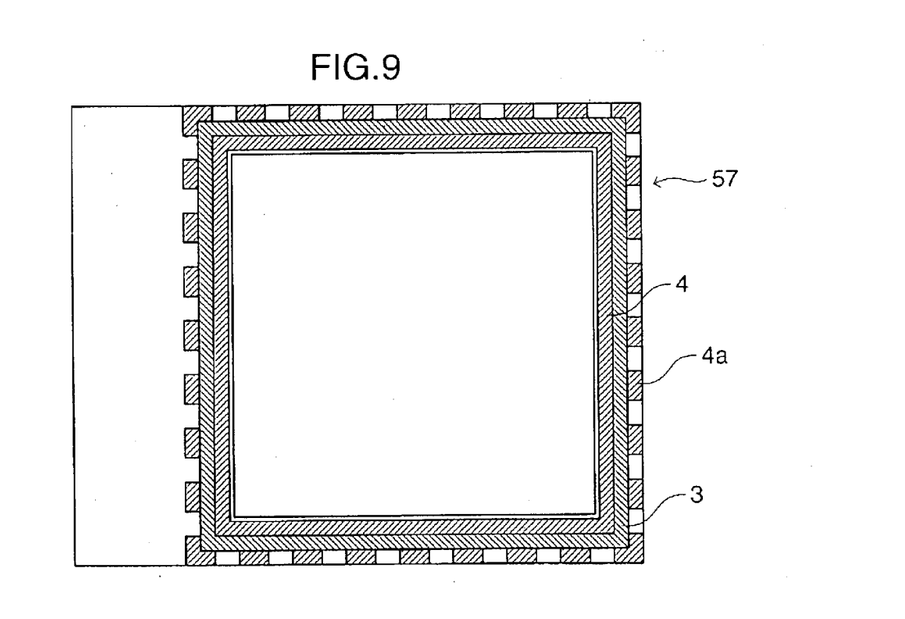
FIG. 9 is a sectional view of the liquid crystal display element as seen in an arrow direction A—A in FIG. 8.

A liquid crystal display element according to a fifth embodiment will be described with reference to FIGS. 8 and 9. FIG. 8 is a sectional view schematically illustrating the construction of the liquid crystal display element according to the fifth embodiment, and FIG. 9 is a sectional view of the liquid crystal display element as seen in an arrow direction A—A in FIG. 8.

The liquid crystal display element 50 according to the fifth embodiment has substantially the same construction as the liquid crystal display element 40 (see FIG. 6) according to the fourth embodiment, except that a seal member 57 thereof is different in structure from the seal member 47 of the liquid crystal display element 40. As shown in FIGS. 8 and 9, the seal member 57 employed in the fifth embodiment is of a three-layer structure like the seal member 47, but is different from the seal member 47 in that an outer UV curable resin layer 4a of the seal member 57 is discontinuous with gaps.

With the use of the seal member 57 having such a structure, a gas component produced from the intermediate thermosetting resin layer 3 is outwardly discharged through the gaps of the outer UV curable resin layer 4a when the intermediate thermosetting resin layer 3 is cured, so that the curing of the intermediate resin layer 3 can be promoted. Further, the gas component produced from the thermosetting resin layer 3 is prevented from intruding into a region (display region) surrounded by the seal member 57. Thus, the degradation of the display quality of the liquid crystal display element 50 can be prevented.

According to the present invention, the seal member includes the plurality of resin layers stacked from the inner side to the outer side. At least one of the plural resin layers is composed of a thermosetting resin, and the rest of the resin layers is composed of a UV curable resin. Therefore, the deformation and offset of the substrates can be suppressed when the seal member is cured, so that the substrates can accurately be combined in a predetermined positional relationship at a predetermined spacing.

What is claimed is:

1. A display element comprising a pair of plastic substrates; a display layer provided between the plastic substrates for performing a display operation; and a looped seal member provided between the plastic substrates, for enclosing the display layer between the plastic substrates; the plastic substrates having different linear expansion coefficients; the looped seal member comprising a plurality of resin layers stacked from an inner side to an outer side, at least one of the resin layers being composed of a thermosetting resin, the rest of the resin layers being composed of a UV curable resin.

2. A display element as set forth in claim 1, wherein the display layer comprises one of a liquid crystal layer and an organic EL layer, and a pair of electrodes provided on opposite sides of the display layer for driving the display layer.

3. A display element as set forth in claim 1, wherein the seal member is of a two-layer structure including an inner layer composed of the thermosetting resin and an outer layer composed of the UV curable resin.

4. A display element as set forth in claim 1, wherein the seal member is of a two-layer structure including an inner layer composed of the UV curable resin and an outer layer composed of the thermosetting resin.

5. A display element as set forth in claim 1, wherein the seal member is of a three-layer structure including an intermediate layer composed of the thermosetting resin and inner and outer layers each composed of the UV curable resin.

6. A display element as set forth in claim 5, wherein the outer layer is formed into a discontinuous structure with gaps.

7. A production method for a display element as recited in claim 1, the production method comprising the steps of: forming a looped seal member on a surface of a first plastic substrate into a structure such that an outer resin layer thereof is discontinuous with gaps in the seal member forming step, the looped seal member comprising a plurality of resin layers stacked from an inner side to an outer side, at least one of the resin layers being composed of a thermosetting resin, the rest of the resin layers being composed of a UV curable resin; combining a second plastic substrate with the first plastic substrate in an opposed relationship with the seal member held between the first plastic substrate and the second plastic substrate; irradiating the seal member with a UV radiation to cure the UV curable resin layer; heating the seal member to cure the thermosetting resin layer; and providing a display layer for performing a display operation in a space defined by the first and second plastic substrates and the seal member.

8. A production method as set forth in claim 7, wherein the first and second plastic substrates have different linear expansion coefficients, the production method further comprising the step of providing a connection terminal on the one of the first and second plastic substrates having a smaller linear expansion coefficient for connection to a driving circuit for driving the display layer.

9. A production method as set forth in claim 7, wherein a plurality of looped seal members are formed on the surface of the first plastic substrate in the seal member forming step, the production method further comprising the step of dividing the combined first and second plastic substrates into regions defined by the respective seal members.

10. A display element comprising a pair of substrates; a display layer provided between the substrates for performing a display operation; and a looped seal member provided between the substrates, for enclosing the display layer between the substrates; the substrates having different linear expansion coefficients; the looped seal member comprising a plurality of resin layers stacked from an inner side to an outer side, at least one of the resin layers being composed of a thermosetting resin, an inmost one of the resin layers being composed of a UV curable resin.

11. A display element as set forth in claim 10, wherein the seal member is of a two-layer structure including an inner layer composed of the UV curable resin and an outer layer composed of the thermosetting resin.

12. A display element as set forth in claim 10, wherein the seal member is of a three-layer structure including an intermediate layer composed of the thermosetting resin and inner and outer layers each composed of the UV curable resin.

13. A display element as set forth in claim 12, wherein the outer layer is formed into a discontinuous structure with gaps.

14. A display element as set forth in claim 10, wherein one of the pair of substrates has a smaller linear expansion than the other and provides a connection terminal thereon for connection to a driving circuit for driving the display layer.

* * * * *